(12) United States Patent
Wang et al.

(10) Patent No.: US 7,241,712 B2
(45) Date of Patent: Jul. 10, 2007

(54) LOW-TEMPERATURE SINTERED BARIUM TITANATE MICROWAVE DIELECTRIC CERAMIC MATERIAL

(75) Inventors: Sea-Fue Wang, Taipei (TW); Yuh-Ruey Wang, Taipei County (TW); Mei-Hui Hsiao, Hualien (TW)

(73) Assignee: National Taiwan University Technology, Taipei (TW)

( * ) Notice: Subject to any disclaimer, the term of this patent is extended or adjusted under 35 U.S.C. 154(b) by 54 days.

(21) Appl. No.: 11/066,303

(22) Filed: Feb. 28, 2005

(65) Prior Publication Data

US 2006/0194691 A1 Aug. 31, 2006

(51) Int. Cl.
*C04B 35/468* (2006.01)
(52) U.S. Cl. .................. 501/137; 501/138; 501/139; 428/210; 428/701; 428/702
(58) Field of Classification Search .............. 501/137, 501/138, 139; 425/210, 701, 702
See application file for complete search history.

(56) References Cited

U.S. PATENT DOCUMENTS

| | | | | |
|---|---|---|---|---|
| 6,107,228 A * | 8/2000 | Sugimoto et al. | ........... | 501/139 |
| 6,458,734 B1 * | 10/2002 | Sugimoto et al. | ........... | 501/139 |
| 6,613,705 B1 * | 9/2003 | Feltz et al. | ................. | 501/32 |
| 6,613,706 B2 * | 9/2003 | Hagiwara et al. | ........... | 501/134 |
| 2005/0095464 A1 * | 5/2005 | Lee et al. | ................... | 428/697 |
| 2006/0035094 A1 * | 2/2006 | Kozuka et al. | ............. | 428/471 |

* cited by examiner

*Primary Examiner*—Karl Group

(57) ABSTRACT

The present invention relates to a low-temperature sintered barium titanate microwave dielectric ceramic material. The host matrix thereof can be represented by $Ba_xTi_yM_zO_{x+2y+k}$, where x is 1~6, y is 1~17, z is 0~1, k is 0~3, M is an element substituting the Ba or Ti ion, for example selected from an alkali metal, an alkaline-earth metal, a transition group or a rare earth group, and preferably $Ba_2Ti_9O_{20}$ or the host matrix containing Zr, Sn, Zn, etc. According to the present invention, a low melting glass is added and a subsequent milling operation is performed to reduce the sintering temperature of the microwave dielectric ceramic material to less than 1,000° C. The low melting glass can be for example the Ba—B—Si—Li glass, Ba—B—Zn—Si—Li glass, Ba—B—Si—Li—Cu glass or Cu—B—Zn—Si—Li glass.

10 Claims, 14 Drawing Sheets

*H. M. A*

US 7,241,712 B2

LOW-TEMPERATURE SINTERED BARIUM TITANATE MICROWAVE DIELECTRIC CERAMIC MATERIAL

BACKGROUND OF THE INVENTION

1. Field of the Invention

The invention relates to a low-temperature sintered barium titanate microwave dielectric ceramic materials, and in particular, to a low-temperature sintered barium titanate microwave dielectric ceramic materials manufactured by adding a low melting glass into $Ba_2Ti_9O_{20}$ as a host material so as to reduce the sintering temperature.

2. Description of the Prior Art

Conventionally, ceramic materials are co-fired with a low melting electrode materials to form a module. However, since the ceramic material has a very high sintering temperature (for example greater than 1300° C.), the application of using the electrode material with a low melting point and high electrical conductivity, e.g. silver, copper or gold, is restricted. Therefore, for a purpose of developing a new-generation high frequency microwave module, the current trend is to reduce the sintering temperature of the ceramic material.

For achieving the principal object of reducing the sintering temperature of the ceramics, three methods are provided. The first method is a liquid-phase sintering by adding a low melting glass. The second method is to synthesize a very fine powder by using chemical processes, which increases the overall surface area and thus reduces the sintering temperature. The third method is to develop a new material capable of being sintered at a low temperature. Although the diameter and the composition of the powders can be precisely controlled by the chemical method, such chemical method is not suitable for mass production and thus the manufacturing cost there is high. In addition, it takes much time to develop a new material. Therefore, adding a low melting glass is widely used. In a case that the material $Ba_2Ti_9O_{20}$ is sintered at a low temperature (for example less than 1,000° C.), once such material is applied to a low-temperature co-fired ceramic (LTCC) or multilayer ceramic (MLC) substrate, it can be co-fired with the electrode material having a low melting point and high electrical conductivity. By using an Ag-Pd electrode with a high Ag content, the cost and volume of the module element are reduced, and the performance thereof is increased.

As shown in the phase diagram of FIG. 1, the range of a pure $Ba_2Ti_9O_{20}$ is very narrow, and it is very difficult to obtain the pure $Ba_2Ti_9O_{20}$ phase when the conventional method of mixing solid powders is used. In Journal of American Ceramic Society, volume 74 (8), pages 1841-1847, 1991, Kirby et al. describes compounds with high $TiO_2$ contents in a $BaO-TiO_2$ system, for example $BaTi_5O_{11}$, $Ba_4Ti_{13}O_{30}$, $BaTi_4O_9$, $Ba_2Ti_9O_{20}$, etc. Among these compounds, $Ba_2Ti_9O_{20}$ the most excellent microwave dielectric properties, and is suitable to be used as a dielectric oscillator. The single-phase $Ba_2Ti_9O_{20}$, however, is difficult to be synthesized because other barium titanate compounds are co-exist.

U.S. Pat. No. 3,938,064 describes a method for preparing a low-loss dielectric material $Ba_2Ti_9O_{20}$. The starting powder is 18~19mole % $BaCO_3$ powder, which is added to a test specimen made of a $TiO_2$ powder under an oxygen-containing atmosphere (i.e. the oxygen content is greater than 90%) and calcined at a temperature ranged between 900 and 1400° C. for a period of from 10 to 100 hrs. Alternatively, the mixed powders can be calcined at a temperature ranged between 1300 and 1420° C. under an oxygen-containing atmosphere. The feature of this patent is that calcining and sintering processes are carried out at a selected barium/titanium ratio and under an oxygen-containing atmosphere. During a solid reaction, some oxide additives are added to promote synthesis of $Ba_2Ti_9O_{20}$ phase, and thus a single-phase $Ba_2Ti9O_{20}$ is obtained.

In Journal of American Ceramic Society, volume 41 (10), pages 390-394, 1958, Jonker describes the addition of $SnO_2$ and $ZrO_2$ as phase stabilizers and a calcination reaction carried at a temperature of 1300° C. so as to synthesize a single-phased $Ba_2Ti_9O_{20}$. In Japanese Journal of Applied Physics, Volume 22 (7), pages 1125-1128, Shoichiro describes the addition of Mn into $Ba_2Ti_9O_{20}$, and the mixture is sintered at a high temperature of 1400° C. for 3 hrs so as to obtain most $Ba_2Ti_9O_{20}$. In Journal of Materials Science Letters, Volume 11, pages 457-459, 1992, Chandar describes the addition of excess $TiO_2$ to stabilize the $Ba_2Ti_9O_{20}$ phase, however, which is obtained at a sinte ring temperature of 1200° C. for 4 hrs. In Journal of American Ceramic Society, Volume 77 (4), pages 1052-1056, Yu describes the addition of oxides such as $SnO2, Al_2O_3, Bi_2O_3$ to the stabilize formation of the $Ba_2Ti_9O_{20}$ phase. However, the single-phased $Ba_2Ti_9O_{20}$ is obtained at a sintering temperature of 1300° C. for 6 hrs.

U.S. Pat. No. 4,353,047 describes an dielectric material having $(1-x)BaO \cdot TiO_2$ as a principal component, wherein $0.7 \leq x \leq 0.95$. To the dielectric material, 0.05~0.3wt % of $MnCO_3$ and 1.0~5.0wt % of $ZrO_2$ are added, mixed and sintered at 1250~1420° C. in the air or an oxygen atmosphere. Then, by using the manganese oxide and zirconium oxide, improved dielectric properties, for example a dielectric constant of 39~89, $\tau_f$ value of +3~+130 ppm/° C. and Q value of 3700~6600, are obtained.

U.S. Pat. No. 6,642,167 describes an insulating ceramic material, the principal component thereof being represented by the formula $BaO-x\{(1-y)TiO_2 \cdot yZrO_2\}$, where $3.5 \leq x \leq 4.5$, $0 \leq y \leq 2$, and the auxiliary component thereof comprising 5~30wt % of ZnO, 0.1~3wt % of $R_2O$ (R is an alkali metal), 0.5~6wt % of $SiO_2$, 0.1~7wt % of CuO, 0.1~6wt % of $V_2O_5$ or $Bi_2O_3$. This ceramic material can be simultaneously sintered together with silver or copper electrodes at a temperature of 1,000° C. or less, and exhibits a high dielectric constant, a high Q value, a small change in capacitance value with temperature, and high environmental resistance. In the Japan Society of Applied Physics, 36, pages L1604-07, 1997, Cheng et al. describe the use of a $5MgO-19CaO-26Al_2O_3-50SiO_2$ (MCAS) glass as a sintering aid. In this study, it is found that the addition of the MCAS glass resulted in enhanced liquid-phase sintering and reduced the sintering temperature of the $Ba_2Ti_9O_{20}$ ceramic. However, the sintering temperature is also greater than 1100° C. In addition, after the addition of the MCAS glass, the main phase of the sintered ceramic material is still $Ba_2Ti_9O_{20}$ phase. The $\epsilon_r$ is increased as temperature is increased, but decreased as the addition of the MCAS glass is decreased. In Materials Research Bulletin, 35(14-15), pages 2445-56, 2,000, Huang et al. describe the use of the simple glasses $B_2O_3$ and $SiO_2$ and the commercial glass PBS $(PbO-B_2O_3-SiO_2)$ as liquid-phase sintering aids so as to effectively reduce the sintering temperature. After $B_2O_3$ and $SiO_2$ are added and the mixture is sintered at 1200° C., 95% of theoretical density is obtained. Whereas, after PBS is added and the mixture is sintered at 1200° C., a single-phased $Ba_2Ti_9O_{20}$ is obtained. With regards to the dielectric properties, after the mixture is sintered at 1200° C., the addition of 5wt % $B_2O_3$ and PBS offer $\epsilon_r$=36.5 and 37.2, Q=6700 and 1650 (at 6 GHz), $\tau_f$=38 and 9 ppm/° C., respectively. However, since this type of glass contains PbO, the application thereof is limited due to the requirement of environmental protection. In Journal of European Ceramic Society, pages 2259-2563, 2003, Huang et al. describe a single phased $Ba_2Ti_9O_{20}$ is obtained after 2 mol % of $SnO_2$ is added and the mixture is sintered at 1350° C. When 50 vol % of a BaBSiO ($42BaO$-$45B_2O_3$-$13SiO_2$) glass is added, and then holding at the temperatures of 800° C., 850° C. and 900° C., respectively, for 1 hr, the second phase $BaTi(BO_3)_2$ is produced, which has no influence on the microwave properties of $Ba_2Ti_9O_{20}$. After the mixture is sintered at 900° C./30 min, the following microwave properties are obtained: $\epsilon_r$=3.2, Q×f=1150.

As known from the above literatures, in order to apply the production processes of the low-temperature co-fired ceramic (LTCC) and multilayer ceramic (MLC) substrate, it is necessary to reduce the sintering temperature of the $Ba_2Ti_9O_{20}$ ceramic material as well as maintain good microwave properties. However, the above technologies fail to meet the requirement due to the following problems:

1. The purposes of reducing the sintering temperature of the $Ba_2Ti_9O_{20}$ ceramic material and maintaining good microwave properties are not simultaneously attained. If good microwave properties are maintained, the sintering temperature fails to be effectively reduced. Likewise, if the sintering temperature is reduced, the dielectric constant ($\epsilon_r$) fails to be maintained, and the good microwave properties, for example $\tau_f \leq \pm 30$ ppm/° C. and Q×f>5,000, are not achieved.

2. Since the sintering temperature is still high (>1,000° C.), the application of being co-fired with the metallic electrode material having a low melting point and a low cost is not acceptable.

3. The addition of heavy metal which is necessary according to the technologies disclosed in the literatures, does not meet the requirement of environmental protection.

SUMMARY OF THE INVENTION

It is an object of the present invention to provide a low-temperature sintered barium titanate microwave dielectric ceramic material, which is effective to reduce the sintering temperature and increase the material desity, and is an environmental protection material.

The low-temperature sintered barium titanate microwave dielectric ceramic material that can accomplish the above-described objects according to the invention includes a host matrix $Ba_xTi_yM_zO_{x+2y+k}$, where x is 1~6, y is 1~17, z is 0~1, k is 0~3, M is an element substituting the Ba or Ti ion, for example selected from an alkali metal, an alkaline-earth metal, a transition group or a rare earth group, and preferably $Ba_2Ti_9O_{20}$. According to the present invention, $B_2O_3$ is added to reduce the synthesis temperature of the host matrix and stabilize the formation of $Ba_2Ti_9O_{20}$ phase. When calcination is performed at 950° C. but the mixture is not subject to a sintering procedure, most single phased $Ba_2Ti_9O_{20}$ is formed. Besides $B_2O_3$, $ZrO_2$ or $SnO_2$ can be added and the mixture is calcined at 1200° C. for 6 hrs. By using these compositions as the ceramic host matrix and then adding low melting glass with an approximate composition of 20~35 wt % BaO, 10~30 wt % $B_2O_3$, 10~30 wt % $SiO_2$, 15~30 wt % ZnO, 15~20 wt % $Li_2O$ and 15~25 wt % CuO, for example the Ba-B-Si-Li glass, Ba-B-Zn-Si-Li glass, Ba-B-Si-Li-Cu glass or Cu-B-Zn-Si-Li glass, the sintering temperature of the $Ba_2Ti_9O_{20}$ microwave dielectric ceramic material will be reduced to less than 1,000° C. and good dielectric properties are maintained. If an additional milling is performed on the host matrix powder and the particle size thereof is controlled, the sintering temperature of the $Ba_2Ti_9O_{20}$ microwave dielectric ceramic will be reduced to 900~950° C., and good dielectric properties are maintained, thereby meeting the requirement of the production processes for the low-temperature co-fired ceramic (LTCC) and multilayer ceramic (MLC) substrate.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

The present invention includes two components. One is the host matrix, which is synthesized to a great proportion of the $Ba_2Ti_9O_{20}$ phase with the addition of 7.5 wt % $B_2O_3$ and after calcination. The other component is the glass matrix. It is found that the Ba-B-Si-Li glass, Ba-B-Zn-Si-Li glass, Ba-B-Si-Li-Cu glass or Cu-B-Zn-Si-Li glass had a great influence on densification and dielectric properties of the $Ba_2Ti_9O_{20}$ microwave dielectric ceramic material.

(I) Host Matrix:

1. Process for Preparing $Ba_2Ti_9O_{20}$ Ceramic Matrix:

In a PVC container, a starting powder containing $BaCO_3$ and $TiO_2$ at a molar ratio of 1:4.5 is placed, and then some zirconia balls are introduced and ball milled for 8 hrs. After mixed, the mixture is dried in an oven at 80° C. The dried powder is heated to 950° C. at a heating rate of 10° C./min, and calcined at 950° C. for 20 hrs. After calcined, a proper amount of powder is taken to perform an XRD analysis. The remaindering powder, the zirconia balls and alcohol are introduced to the original PVC container, ball milled for 24 hrs, and dried. The dried powder is called "H.M.A".

2. Process for Preparing $Ba_2Ti_9O_{20}$ Ceramic Matrix with the Addition of $B_2O_3$:

In a PVC container, a starting powder containing $BaCO_3$ and $TiO_2$ at a molar ratio of 1:4.5 and 7.5 wt % $B_2O_3$ are placed, and then some zirconia balls are introduced and ball milled for 8 hrs. After mixed, the mixture is dried in an oven at 80° C. The dried powder is heated to 950° C. at a heating rate of 10° C./min, and calcined at 950° C. for 20 hrs. After calcination, a proper amount of powder is taken to perform an XRD analysis. The remaindering powder, the zirconia balls and alcohol are introduced to the original PVC container, ball milled for 24 hrs, and dried. The dried powder is called "H.M.B".

Figure 1:
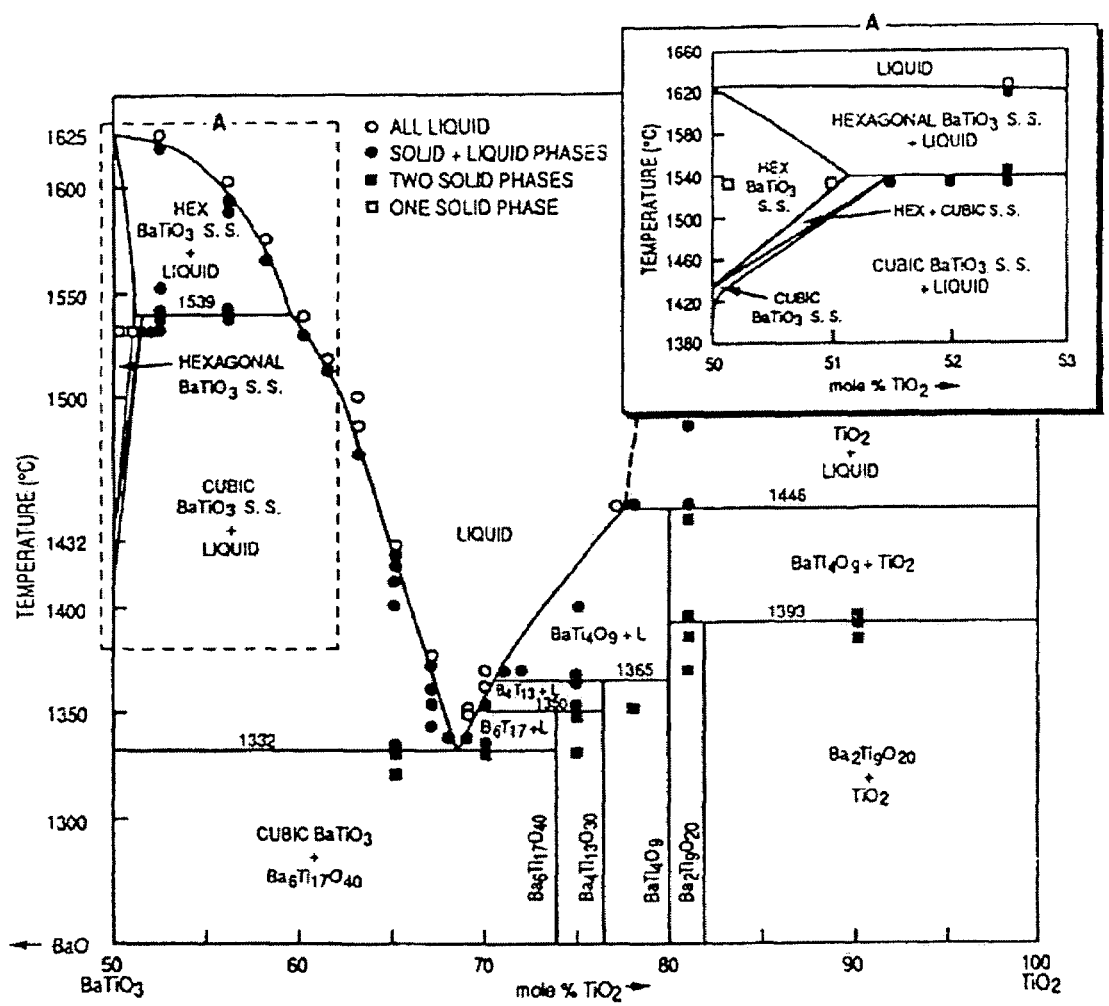
FIG. 1 is a phase diagram of a $BaO$-$TiO_2$ system.
Figure 2:
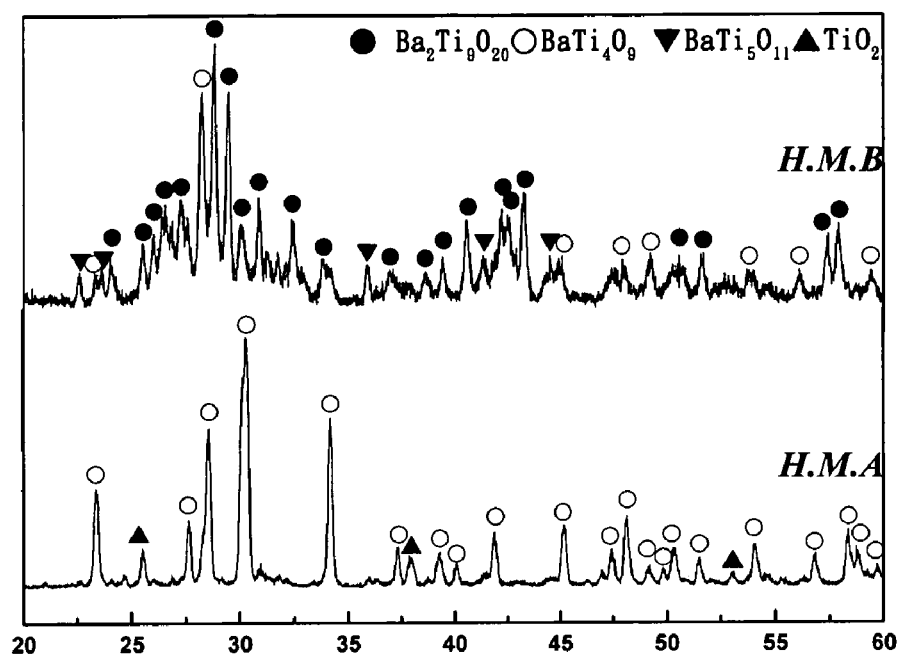
FIG. 2 illustrates the XRD analysis diagrams of H.M.A and H.M.B after calcined.
Figure 3:
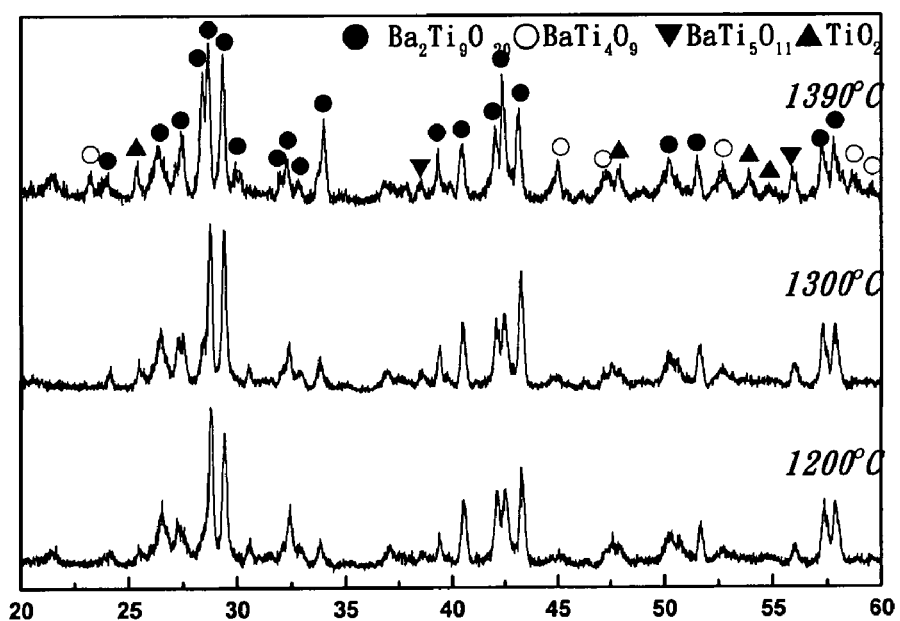
FIG. 3 illustrates the XRD analysis diagram of H.M.A after sintered.
Figure 4:
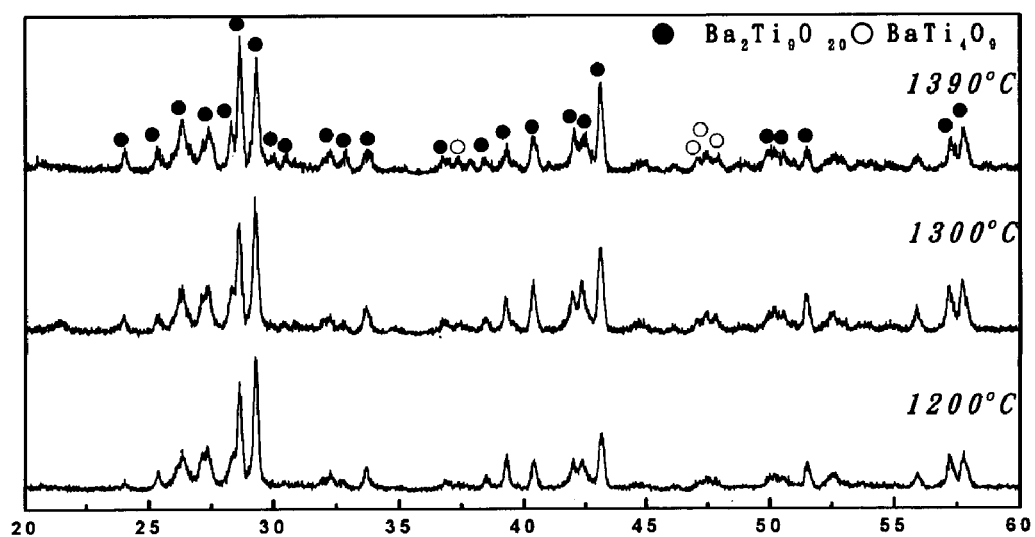
FIG. 4 illustrates the XRD analysis diagram of H.M.B after sintered.

When the compositions of the above two matrices (H.M.A and H.M.B) are compared, as shown in FIG. 2, the H.M.A is a single phase $BaTi_4O_9$ with a small amount of $TiO_2$, and the H.M.B comprises a large proportion of $Ba_2Ti_9O_{20}$ phase and a small portion of $BaTi_4O_9$ or $BaTi_5O_{11}$ phase. The above two matrices (H.M.A and H.M.B) are sintered at 1200° C., 1300° C. and 1390° C., respectively. The phase analyses of FIGS. 3 and 4 indicate a large proportion of $Ba_2Ti_9O_{20}$ phase and a small proportion of the second phase are obtained.

3. Process for Preparing $Ba_2Ti_9O_{20}$ Ceramic Matrix with the Addition of $ZrO_2$:

In a PVC container, a starting powder containing $BaCO_3$ and $TiO_2$ at a molar ratio of 1:4.5 and 0.5-6 mol % $ZrO_2$ are placed, and then some zirconia balls are introduced and ball milled for 8 hrs. After mixed, the mixture is dried in an oven at 80° C. The dried powder is heated to 1200° C. at a heating rate of 10° C./min, and calcined at 1200° C. for 6 hrs. After calcination, a proper amount of powder is taken to perform an XRD analysis. The remaindering powder, the zirconia balls and alcohol are introduced to the original PVC container, ball milled for 24 hrs, and dried. The dried powder is called "H.M.C".

4. Process for Preparing $Ba_2Ti_9O_{20}$ Ceramic Matrix with the Addition of $SnO_2$:

In a PVC container, a starting powder containing $BaCO_3$ and $TiO_2$ at a molar ratio of 1:4.5 and 0.5-6 mol % $SnO_2$ (in replace of $TiO_2$) are placed, and then some zirconia balls are introduced and ball milled for 8 hrs. After mixed, the mixture is dried in an oven at 80° C. The dried powder is heated to 1200° C. at a heating rate of 10° C./min, and calcined at 1200° C. for 5 hrs. After calcination, a proper amount of powder is taken to perform an XRD analysis. The remaindering powder, the zirconia balls and alcohol are introduced to the original PVC container, roll milled for 24 hrs, and dried. The dried powder is called "H.M.D".

The main component of the host matrix suitable to be used in the present invention can be represented as the following formula: $Ba_xTi_y(Ma_nMb_{1-n})_{2z}O_{x+2y+k}$; where x is 1~6, y is 1~17, z is 0~1, n is 0~1, k is 0~3, Ma is an element substituting the Ba ion, for example Ca, Mg, K, Na, etc., and Mb is an element substituting the Ti ion, for example Zr, Al, Fe, Sn, Nb or Nd.

(II) Addition of Glass:

The proportions of glasses used in this example are shown in Table's 1 and 2. High-purity $BaCO_3$, $B_2O_3$, $SiO_2$, ZnO, CuO and $Li_2CO_3$ powders are weighted according to the selected proportions. Each glass system is premixed for 1 hr by a mortar. 10 wt % of glass system is added to the $Ba_2Ti_9O_{20}$ ceramic matrix powder, placed in a PVC container, some zirconia balls and alcohol are introduced and mixed for 4 hrs. The slurry of the mixture is dried at 80° C. The following powder processing is carried out: 4% PVA is added for granulation, screened by a 60-mesh sieve, compacted in a single shaft molding machine under 1T/cm² for 1 min so as to form a test specimen with d=9.2 mm and t=2 mm; the test specimen is held at 550° C. for 4 hrs, and PVA is removed; the test specimen is heated to 900° C., 950° C., 1,000° C. and 1100° C., respectively, at a heating rate of 10° C./min, and sintered at the respective temperature for 4 hrs. The sintered test specimens are characterized in respect to the their densification, phase formations, microstructure and microwave dielectric properties.

Figure 9:
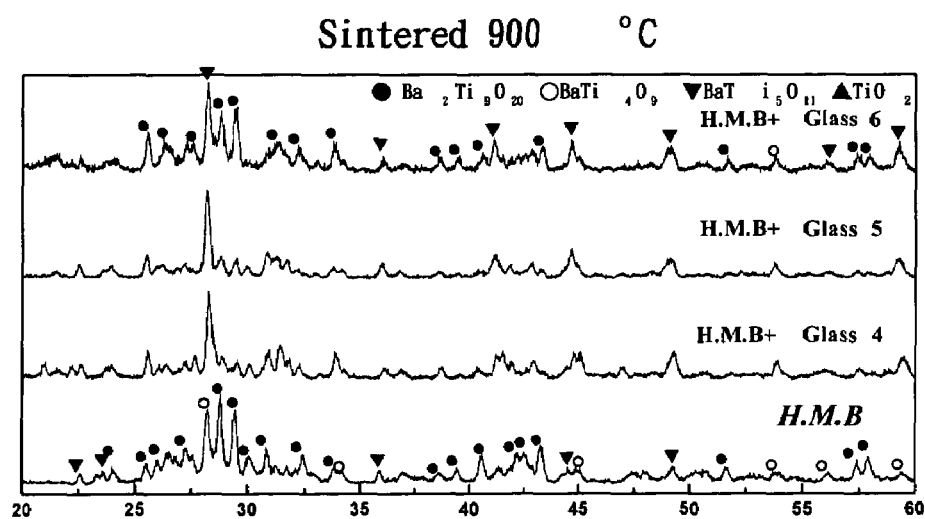
FIG. 9 illustrates the XRD analysis diagram of H.M.B with the addition of a glass and sintered at 900° C.
Figure 10:
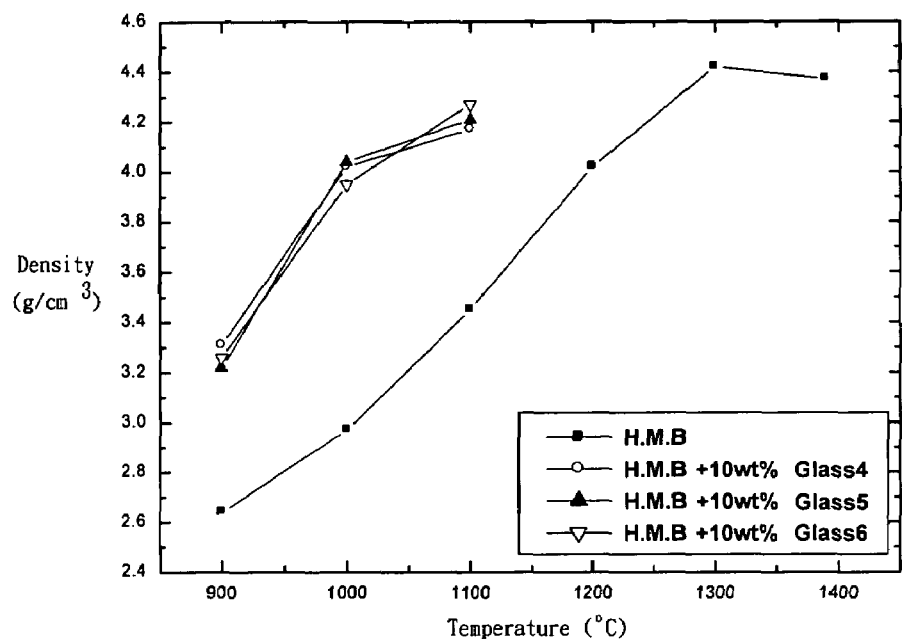
FIG. 10 is a comparison diagram illustrating the sintering densities of the pure H.M.B and the H.M.B. with the addition of a glass.

With the addition of a glass, H.M.B is sintered at 900° C. The XRD analysis of FIG. 9 shows that the main phase is $Ba_2Ti_9O_{20}$, but some secondary phases form. As shown in FIG 10, when sintered at 1,000° C., the density of the H.M.B. with the addition of Glass 5, 4 or 6 is better than that of the pure H.M.B sintered at 1200° C. In views of the electrical properties, with the addition of these glasses, the

TABLE 1

| No. | Component | BaO (wt %) | $B_2O_3$ (wt %) | $SiO_2$ (wt %) | ZnO (wt %) | $Li_2O$ (wt %) | CuO (wt %) |
|---|---|---|---|---|---|---|---|
| Glass 1 | $35BaO60B_2O_315SiO_220Li_2O$ | 35 | 60 | 15 | — | 20 | |
| Glass 2 | $20CuO51B_2O_330SiO_215ZnO20Li_2O$ | 20 | 51 | 30 | 15 | 20 | 20 |
| Glass 3 | $25BaO54B_2O_310SiO_230ZnO15Li_2O$ | 25 | 54 | 10 | 30 | 15 | — |

TABLE 2

| No. | Component | BaO (wt %) | $B_2O_3$ (wt %) | $SiO_2$ (wt %) | ZnO (wt %) | $Li_2O$ (wt %) | CuO (wt %) |
|---|---|---|---|---|---|---|---|
| Glass 4 | $35BaO30B_2O_315SiO_220Li_2O$ | 35 | 30 | 15 | — | 20 | — |
| Glass 5 | $20CuO20B_2O_315SiO_230ZnO15Li_2O$ | 20 | 15 | 30 | 15 | 20 | 20 |
| Glass 6 | $25BaO20\ B_2O_310\ SiO_230ZnO15Li_2O$ | 25 | 20 | 10 | 30 | 15 | — |
| Glass 7 | $29BaO25B_2O_312.5SiO_216.7Li_2O16.8CuO$ | 29 | 25 | 12.5 | — | 16.7 | 16.8 |
| Glass 8 | $27BaO23B_2O_312\ SiO_215.4Li_2O22.6CuO$ | 27 | 23 | 12 | — | 15.4 | 22.6 |

Figure 5:
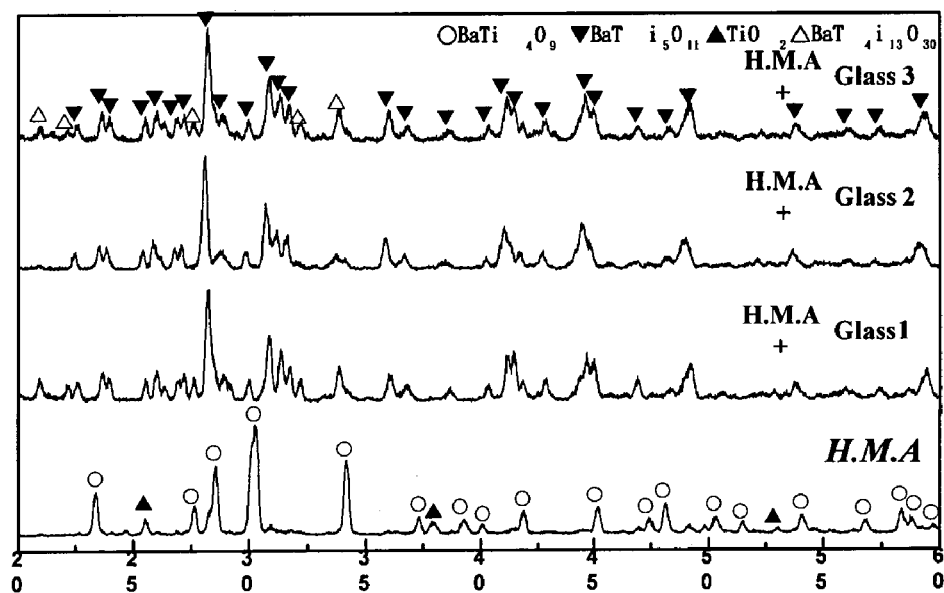
FIG. 5 illustrates the XRD analysis diagram of H.M.A with the addition of a glass and sintered at 900° C.
Figure 6:
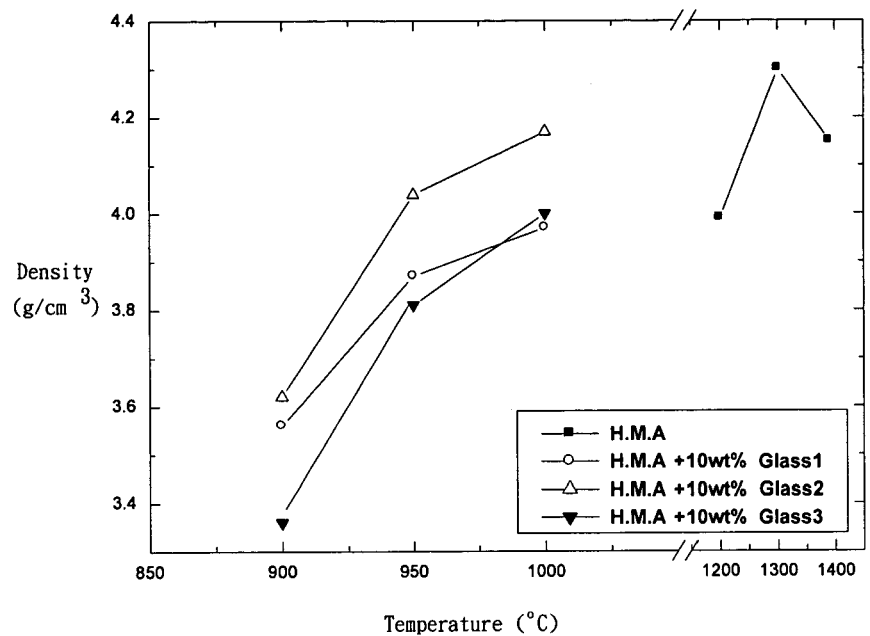
FIG. 6 is a comparison diagram illustrating the sintering densities of the pure H.M.A and the H.M.A. with the addition of a glass.
Figure 7:
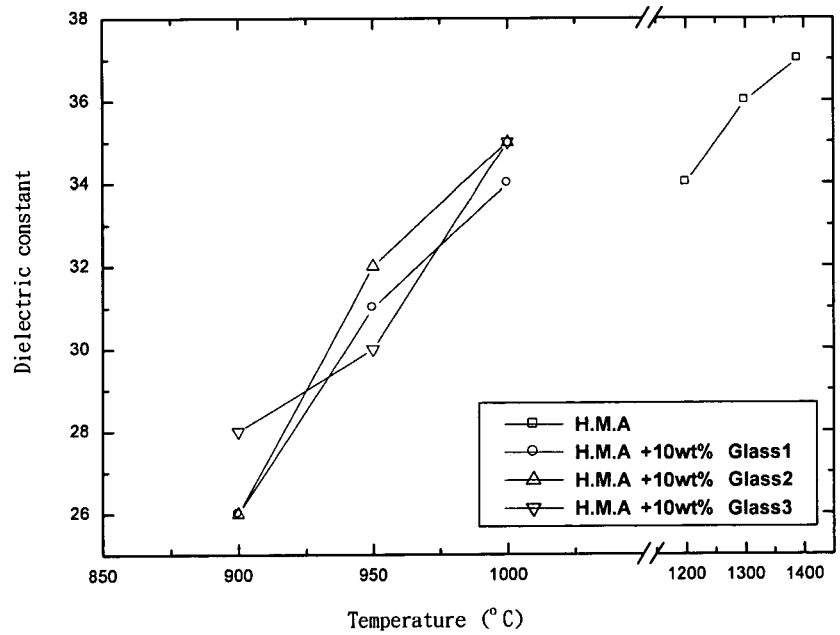
FIG. 7 is a comparison diagram illustrating the dielectric constants of the pure H.M.A and the H.M.A. with the addition of a glass.
Figure 8:
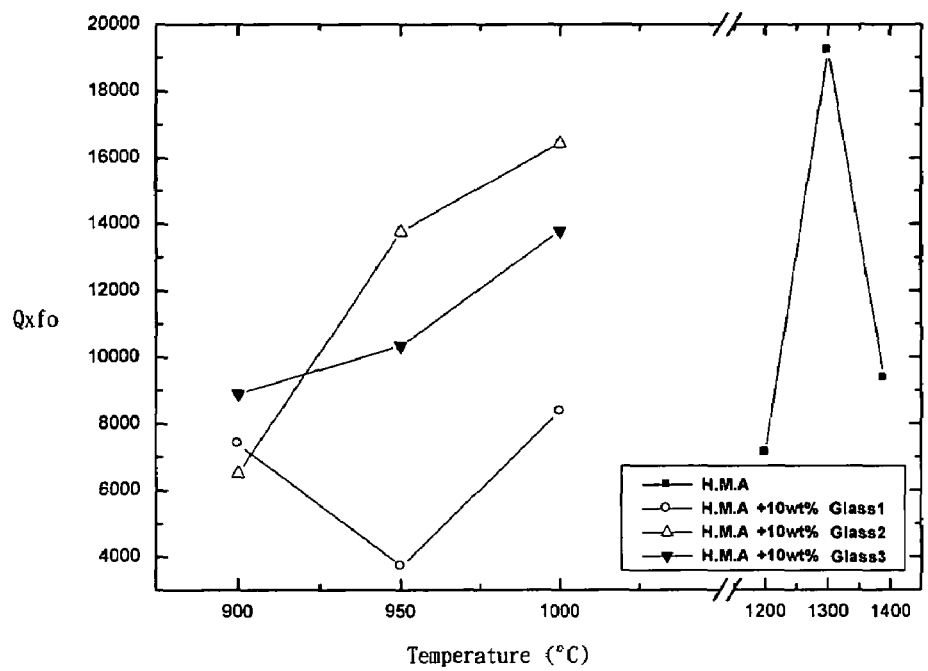
FIG. 8 is a comparison diagram illustrating the values Q×fo of the pure H.M.A and the H.M.A. with the addition of a glass.

With the addition of a glass, H.M.A is sintered at 900° C. The XRD analysis of FIG. 5 shows that the main phase is $BaTi_5O_{11}$, and the addition of Glass 2 achieves the best densification. As shown in FIG. 6, when sintered at 950° C., the density of the H.M.A with the addition of Glass 2 is better than that with the addition of Glass 1 or 3, e.g. up to 4g/cm³, which is superior to the result of H.M.A sintered at 1200° C. In views of the electrical properties, with the addition of three types of glasses, the $\epsilon_r$ of the H.M.A at 900° C. are not higher than about 26. However, in a case that the sintering temperature is increased to 950° C., the $\epsilon_r$ of the H.M.A with the addition of Glass 2 can reach 32 (as shown in FIG. 7), and the value Q×f is about 14,000 (as shown in FIG. 8). When sintered at 1,000° C., the Fr of the H.M.A with the addition of any one of the three glasses is higher than that of H.M.A sintered at 1,200° C. That is, in a case that Glass 2 is added to the H.M.A, the sintering temperature can be reduced to 950° C. and a good microwave property is maintained. The comparison results of the density and electrical property (after sintered) for the H.M.A and the H.M.A. with the addition of a glass are listed in Table 3.

TABLE 3

| Composition | Sintering temperature (° C.) | D (g/cm³) | T.D (%) | $\epsilon_r$ | Q × fo |
|---|---|---|---|---|---|
| H.M.A | 1200 | 3.99 | 87 | 34 | 7127 |
| | 1300 | 4.295 | 93 | 36 | 19229 |
| | 1390 | 4.15 | 90 | 37 | 9347 |
| H.M.A + 10 wt % Glass 1 | 900 | 3.56 | 77 | 26 | 7400 |
| | 950 | 3.87 | 84 | 31 | 3715 |
| | 1000 | 3.97 | 86 | 34 | 8361 |
| H.M.A + 10 wt % Glass 2 | 900 | 3.62 | 79 | 26 | 6526 |
| | 950 | 4.04 | 88 | 32 | 13769 |
| | 1000 | 4.17 | 90 | 35 | 16438 |
| H.M.A + 10 wt % Glass 3 | 900 | 3.36 | 73 | 28 | 8893 |
| | 950 | 3.81 | 83 | 30 | 10334 |
| | 1000 | 4.0 | 87 | 35 | 13795 |

Figure 11:
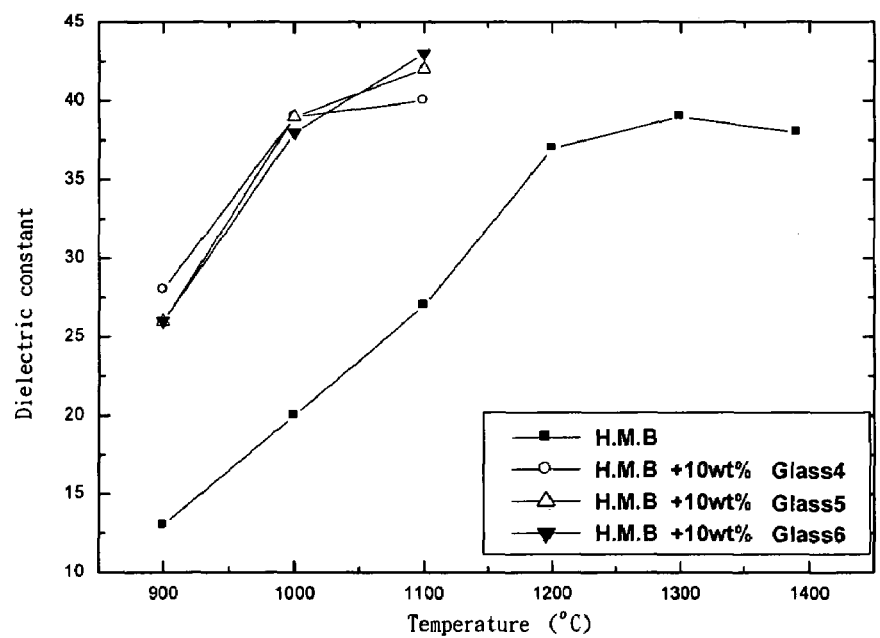
FIG. 11 is a comparison diagram illustrating the dielectric properties of the pure H.M.B and the H.M.B. with the addition of a glass.
Figure 12:
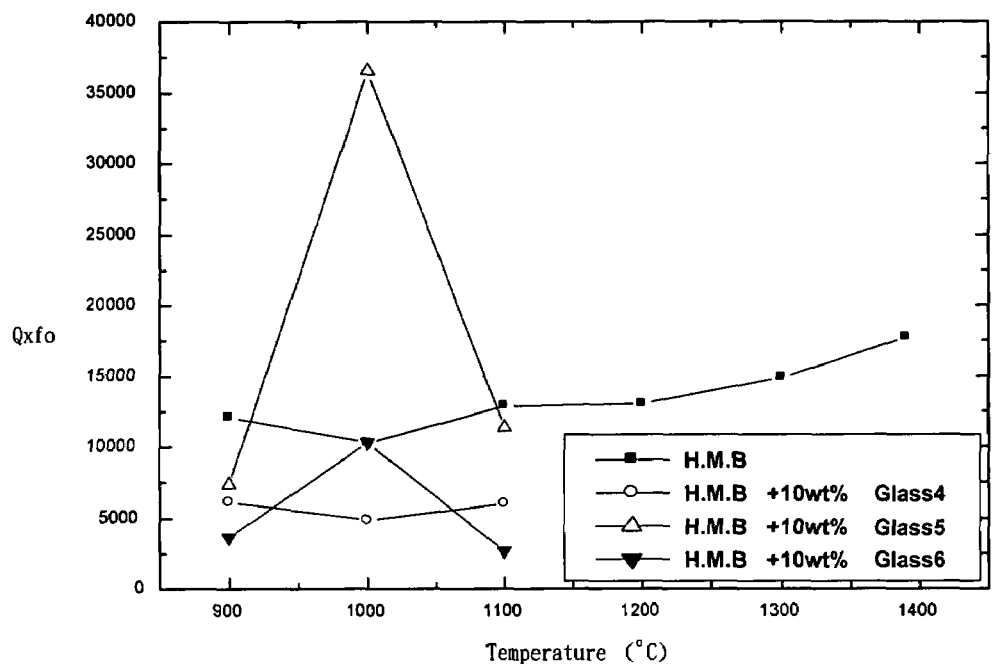
FIG. 12 is a comparison diagram illustrating the values Q×fo of the pure H.M.B and the H.M.B. with the addition of a glass.

$\epsilon_r$ of the H.M.B at 900° C. are not higher than about 25. However, in a case that the sintering temperature is increased to 1,000° C., the $\epsilon_r$ of the H.M.B with the addition of any one of the three glasses is higher than that of H.M.B sintered at 1,200° C. (as shown in FIG. 11). The value Q×fo of the H.M.B with the addition of Glass 5 is about 30,000 (as shown in FIG. 12). That is, in a case that any one of the three glasses is added to the H.M.B, the sintering temperature can be reduced to 1,000° C. and a good microwave property is maintained. The composition results of the density and electrical property (after sintered) for the H.M.B and the H.M.B with the addition of a glass are listed in Table 4.

TABLE 4

| Composition | Sintering temperature (° C.) | D (g/cm³) | T.D (%) | $\epsilon_r$ | Q × fo |
|---|---|---|---|---|---|
| H.M.B | 900 | 2.64 | 57 | 13 | 12073 |
| | 1000 | 2.97 | 64 | 20 | 10285 |
| | 1100 | 3.45 | 75 | 27 | 12867 |
| | 1200 | 4.02 | 87 | 37 | 13000 |
| | 1300 | 4.42 | 96 | 39 | 14849 |
| | 1390 | 4.37 | 95 | 38 | 17712 |
| H.M.B + 10 wt % Glass 4 | 900 | 3.31 | 72 | 28 | 6142 |
| | 1000 | 4.02 | 87 | 39 | 4850 |
| | 1100 | 4.17 | 91 | 40 | 6006 |
| H.M.B + 10 wt % Glass 5 | 900 | 3.22 | 70 | 26 | 7358 |
| | 1000 | 4.04 | 88 | 39 | 36519 |
| | 1100 | 4.21 | 91 | 42 | 11350 |
| H.M.B +10 wt % Glass 6 | 900 | 3.26 | 71 | 26 | 3648 |
| | 1000 | 3.95 | 86 | 38 | 10302 |
| | 1100 | 4.27 | 92 | 43 | 2660 |

(III) Micro-Machined Powder Use Fine Calcined Powders

Two matrices made of different $Ba_2Ti_9O_{20}$ ceramic powders are calcined, 10 wt % of glassy additives are added, and additional milled for 8 hrs by a planetary mill and some 2-mm zirconia balls. The slurry of the mixture is dried at 80° C. The following processing is carried out: 4% PVA is added for granulation, screened by a 60-mesh sieve, compacted in a single shaft molding machine under 1T/cm² for 1 min so as to form a test specimen with d=9.2 mm and t=2 mm; the test specimen is held at 550° C. for 4 hrs, and PVA is removed. The test specimen is heated to 900° C., 950° C., 1,000° C. and 1100° C., respectively, at a heating rate of 10° C./min, and sintered for 4 hrs. The sintered test specimens are charaterized in respect to the densification, phase formations, microstructure and microwave dielectric properties.

Figure 13:
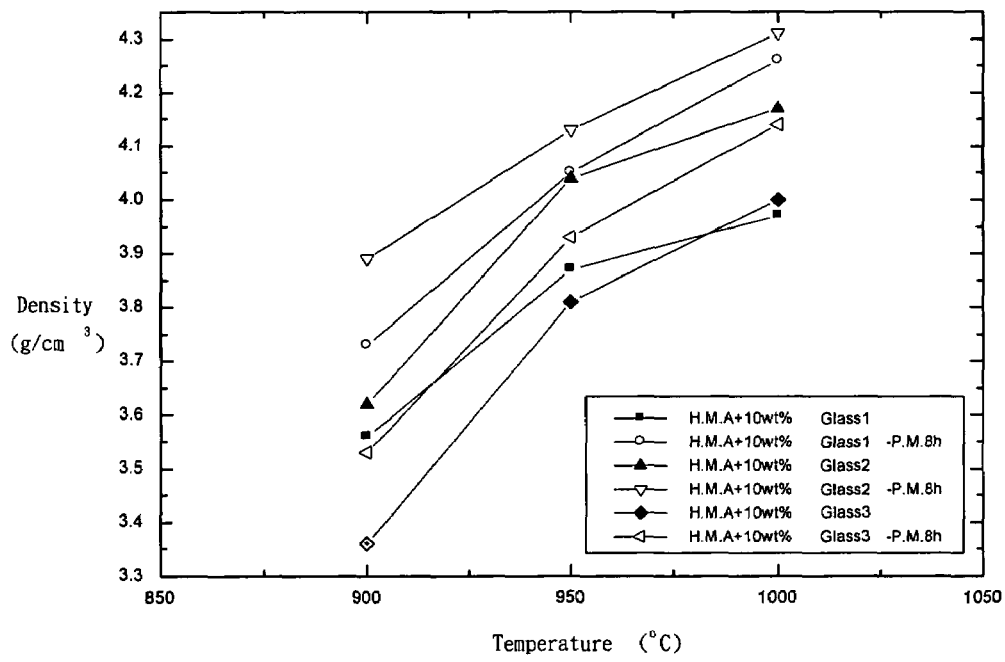
FIG. 13 is a comparison diagram illustrating the sintering densities of the H.M.A with the addition of a glass as well as the H.M.A with the addition of a glass and an additional planetary milling for 8 hrs.
Figure 14:
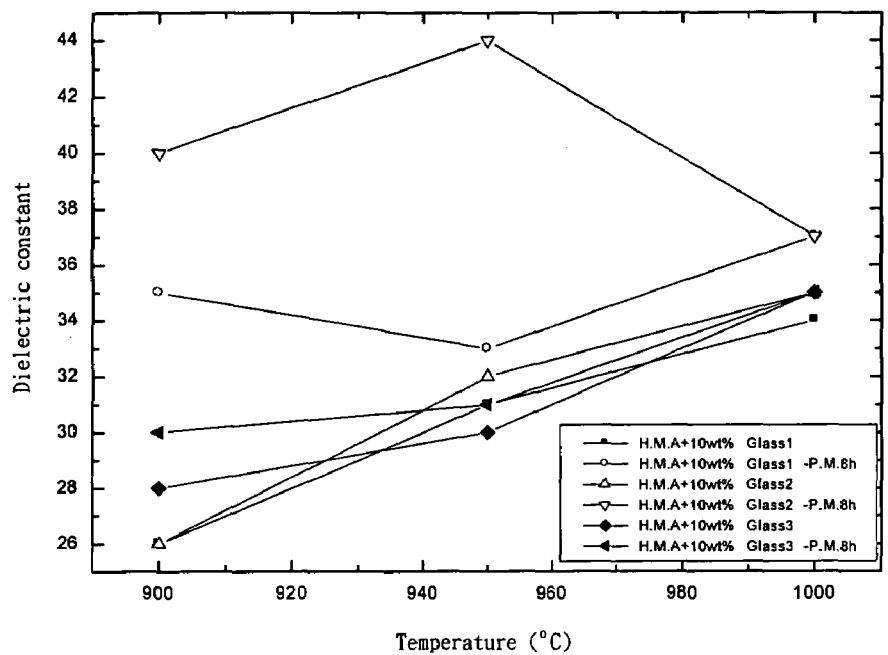
FIG. 14 is a comparison diagram illustrating the dielectric constants of the H.M.A with the addition of a glass as well as the H.M.A with the addition of a glass and an additional planetary milling for 8 hrs.
Figure 15:
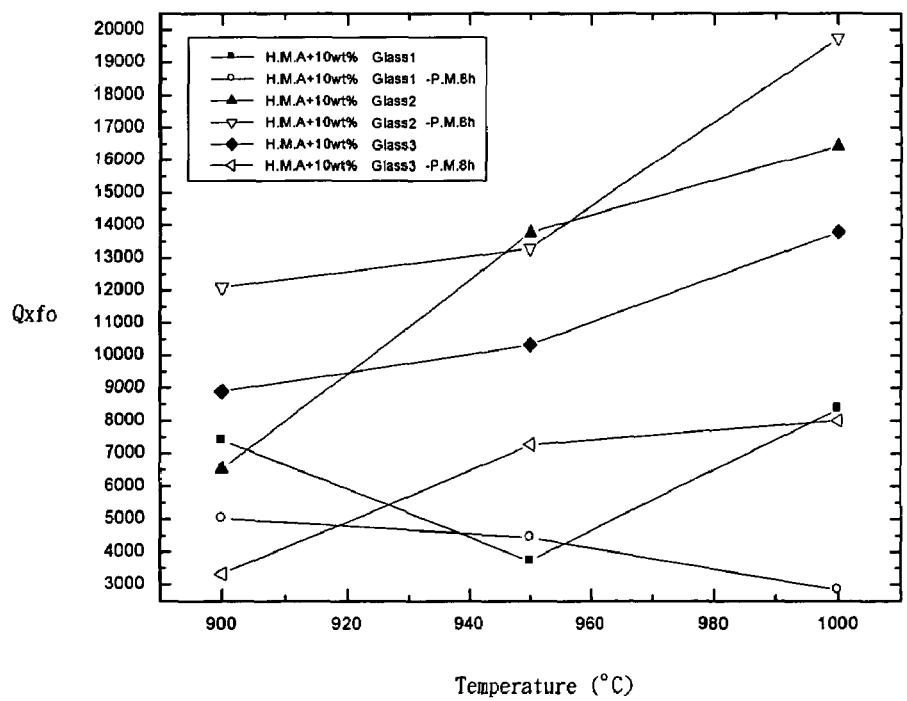
FIG. 15 is a comparison diagram illustrating the values Q×fo of the H.M.A with the addition of a glass as well as the H.M.A with the addition of a glass and an additional planetary milling for 8 hrs

With the addition of a glass, the sintering density obtained for H.M.A with additional planetary milling and sintered at 900° C. is high than that without additional milling. As shown in FIG. 13, the density of the H.M.A with the addition of Glass 2 when sintered at 900° C. is better than that with the addition of Glass 1 or 3, e.g. up to 3.9 g/cm³. In views of the electrical properties, with the addition of three types of glasses, the $\epsilon_r$ of the H.M.A with additional milling and sintered at 900° C. can reach above 30 (as shown in FIG. 14). The $\epsilon_r$ of the H.M.A with the addition of Glass 2 can reach 39 (as shown in FIG. 14), and the Q×fo is about 12,000 (as shown in FIG. 15). That is, in a case that the glass is added to the H.M.A and a additional milling operation is performed, the sintering temperature can be reduced to 900° C. and a good microwave property is maintained. The comparison results of the density and electrical property (after sintered) for the H.M.A and the H.M.A. with the addition of a glass and followed by an addition planetary milled are listed in Table 5.

Figure 16:
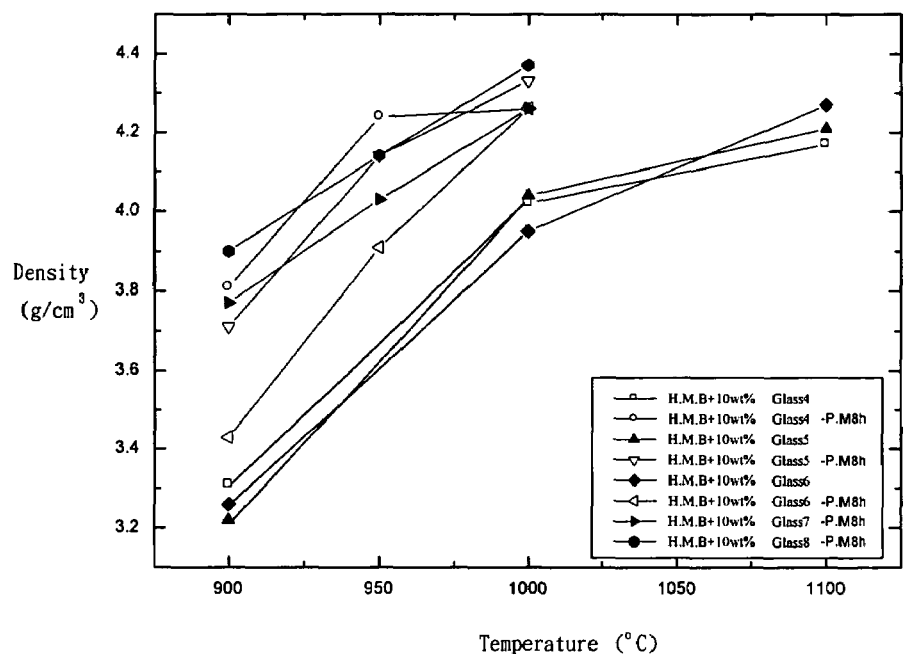
FIG. 16 is a comparison diagram illustrating the sintering densities of the H.M.B with the addition of a glass as well as the H.M.B with the addition of a glass and an additional planetary milling for 8 hrs
Figure 17:
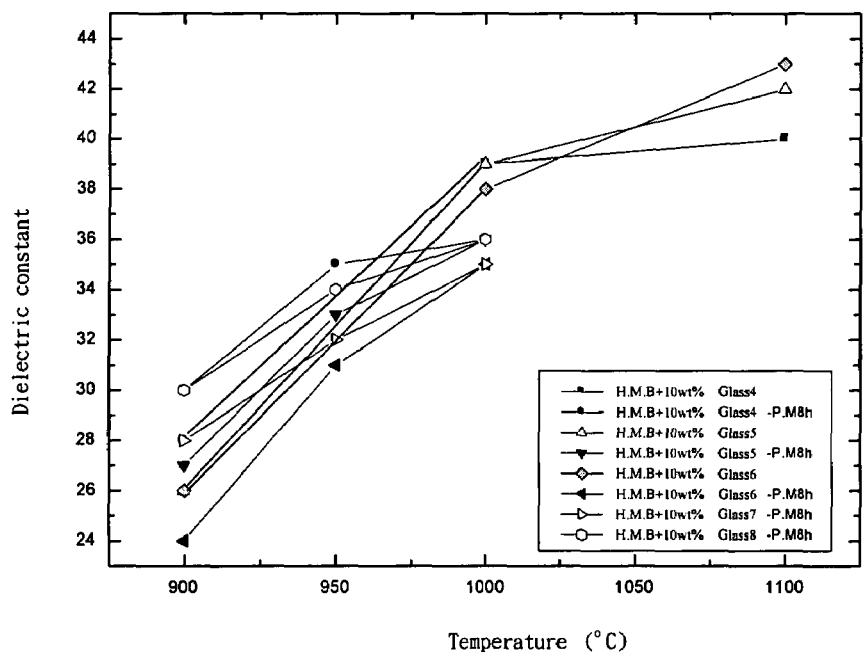
FIG. 17 is a comparison diagram illustrating the dielectric constants of the H.M.B with the addition of a glass as well as the H.M.B with the addition of a glass and an additional planetary milling for 8 hrs
Figure 18:
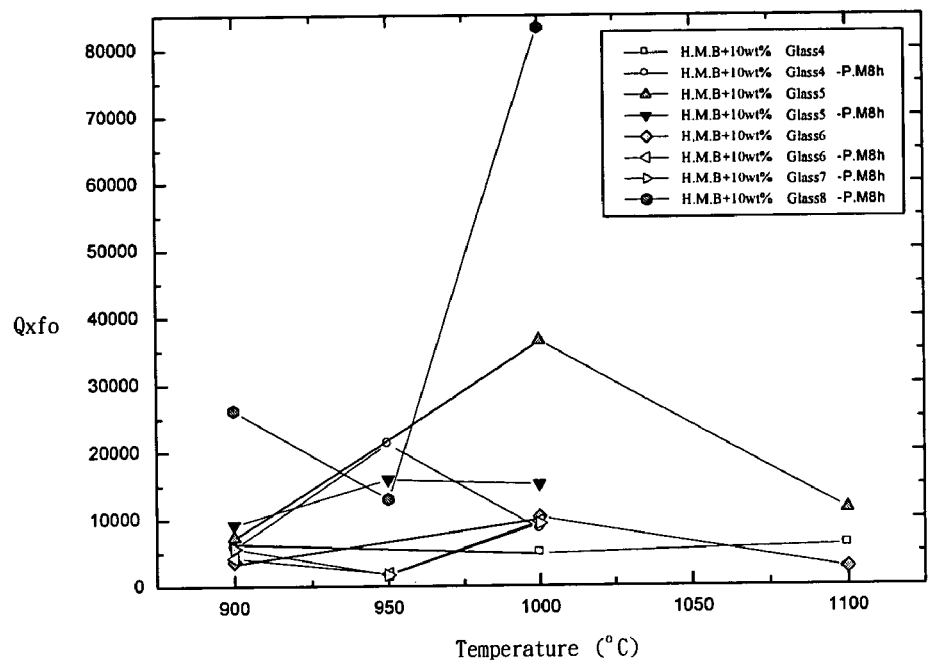
FIG. 18 is a comparison diagram illustrating the values Q×fo of the H.M.B with the addition of a glass as well as the H.M.B with the addition of a glass and an additional planetary milling for 8 hrs
Figure 19:
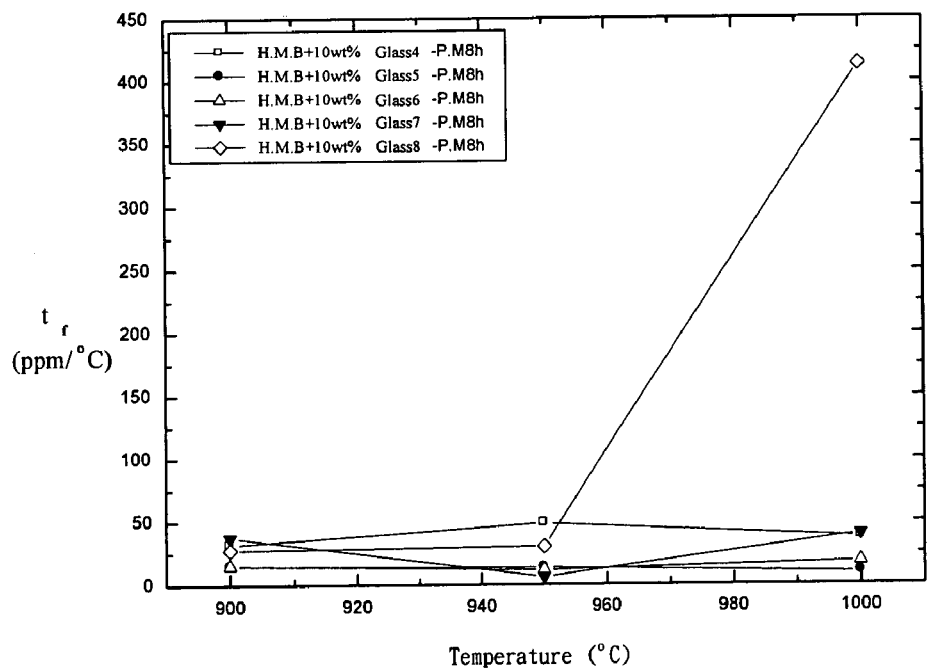
FIG. 19 is a comparison diagram illustrating the values $\tau_f$ of the H.M.B with the addition of a glass and a subsequent planetary milling for 8 hrs.

Similarly, with the addition of a glass, the sintering density obtained for H.M.B with additional planetary milling and sintered at 900° C. is higher than that without additional milling. As shown in FIG. 16, the sintering density of the H.M.B with the addition of Glass 8 is the highest, e.g. up to 3.9 g/cm³. In views of the electrical properties, with the addition of three types of glasses, the value $\epsilon_r$ of the H.M.B with additional milled and sintered at 950° C. can reach above 30 (as can be seen in FIG. 17), and the value cfis maintained below 50 ppm/° C. (as shown in FIG. 19). In a case that Glass 8 is added, the H.M.B obtains a Q×fo of about 25,000 when sintered at 900° C. (as shown in FIG. 18), but the $\tau_f$ of above 400 ppm/° C. is obtained when sintered at 1,000° C. That is, in a case that the glass is added to the H.M.B and a followed planetary milling is performed, the sintering temperature can be reduced to 950° C. and a good microwave property is maintained. The comparison results of the density and electrical property (after sintered) for the H.M.B and the H.M.B. with the addition of a glass and followed by an addition planetary milling are listed in Table 6.

TABLE 5

| Composition | Sintering temperature (° C.) | D (g/cm³) | $\epsilon_r$ | Q × fo |
|---|---|---|---|---|
| H.M.A + 10 wt % Glass 1-P.M.8h | 900 | 3.73 | 35 | 5008 |
| | 950 | 4.05 | 33 | 4445 |
| | 1000 | 4.26 | 37 | 2839 |
| H.M.A + 10 wt % Glass 2-P.M.8h | 900 | 3.89 | 40 | 12111 |
| | 950 | 4.13 | 44 | 13292 |
| | 1000 | 4.31 | 37 | 19738 |
| H.M.A + 10 wt % Glass 3-P.M.8h | 900 | 3.53 | 30 | 3330 |
| | 950 | 3.93 | 31 | 7271 |
| | 1000 | 4.14 | 35 | 8007 |

TABLE 6

| Composition | Sintering temperature (° C.) | D (g/cm³) | $\epsilon_r$ | Q × fo | $\tau_f$ (ppm/° C.) |
|---|---|---|---|---|---|
| H.M.A + 10 wt % Glass 4-P.M.8h | 900 | 3.81 | 30 | 5763 | 31.97 |
| | 950 | 4.24 | 35 | 21257 | 48.72 |
| | 1000 | 4.26 | 36 | 8414 | 37.58 |
| H.M.A + 10 wt % Glass 5-P.M.8h | 900 | 3.71 | 27 | 9234 | 14.96 |
| | 950 | 4.14 | 33 | 15920 | 13.48 |
| | 1000 | 4.33 | 36 | 15149 | 9.47 |
| H.M.A + 10 wt % Glass 6-P.M.8h | 900 | 3.43 | 24 | 4209 | 15.28 |
| | 950 | 3.91 | 31 | 1800 | 11.71 |
| | 1000 | 4.26 | 35 | 9620 | 17.62 |
| H.M.A + 10 wt % Glass 7-P.M.8h | 900 | 3.77 | 28 | 5635 | 37.55 |
| | 950 | 4.03 | 32 | 1620 | 6.10 |
| | 1000 | 4.26 | 35 | 9318 | 39.89 |
| H.M.A + 10 wt % Glass 8-P.M.8h | 900 | 3.90 | 30 | 26166 | 27.79 |
| | 950 | 4.14 | 34 | 13000 | 30.34 |
| | 1000 | 4.37 | 36 | 83180 | 413.43 |

Figure 20:
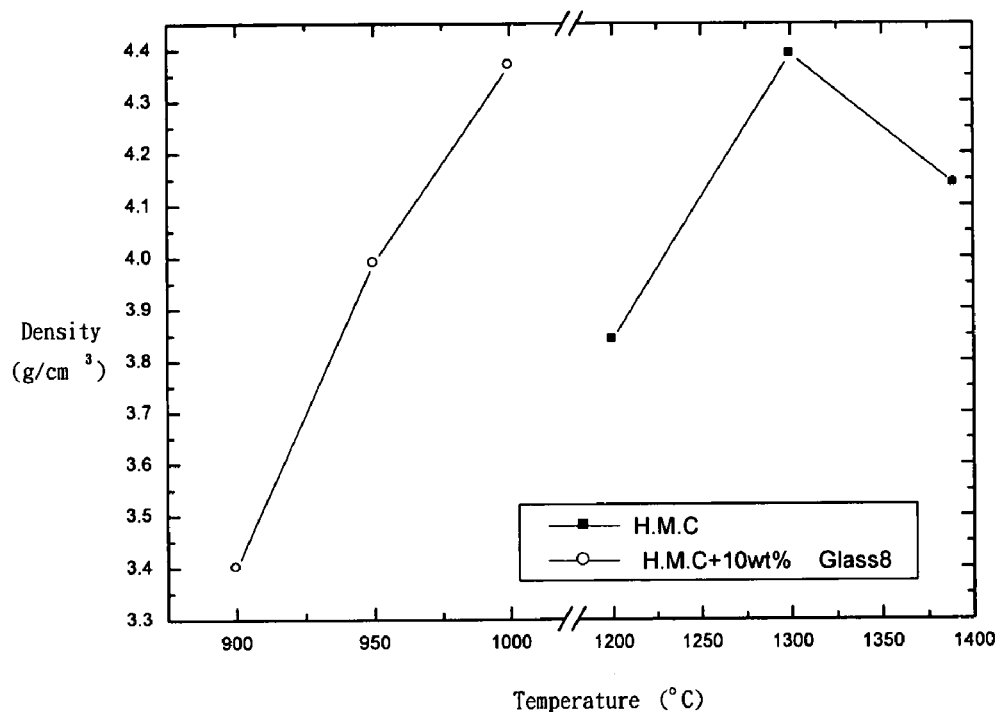
FIG. 20 is a comparison diagram illustrating the sintering densities of the pure H.M.C as well as the H.M.C with the addition of a glass and an additional planetary milling.
Figure 21:
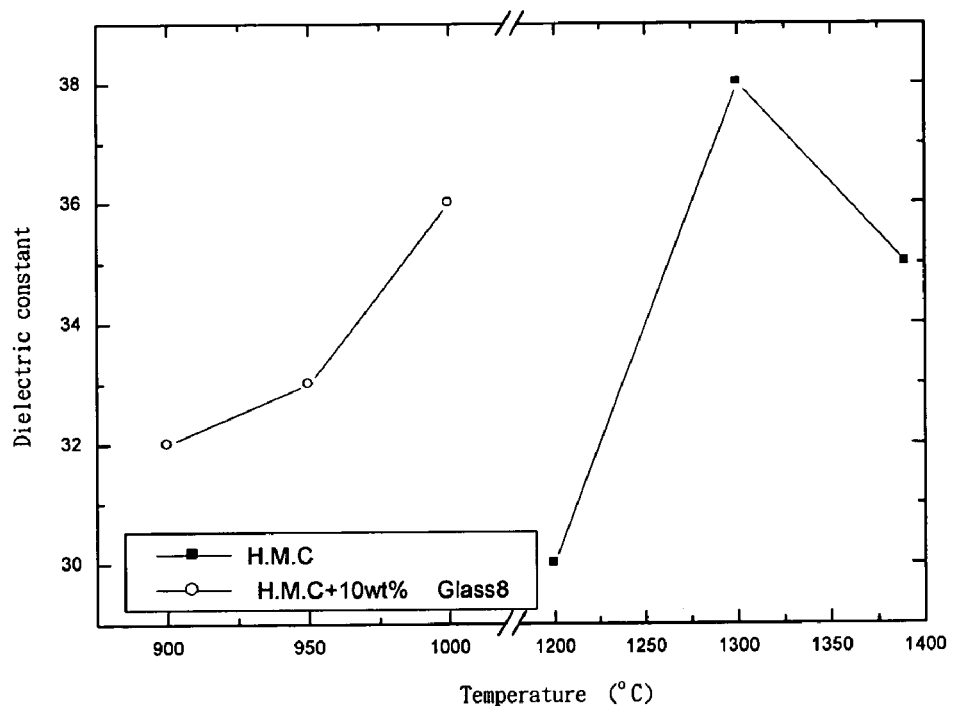
FIG. 21 is a comparison diagram illustrating the dielectric constants of the pure H.M.C as well as the H.M.C with the addition of a glass and an additional planetary milling.
Figure 22:
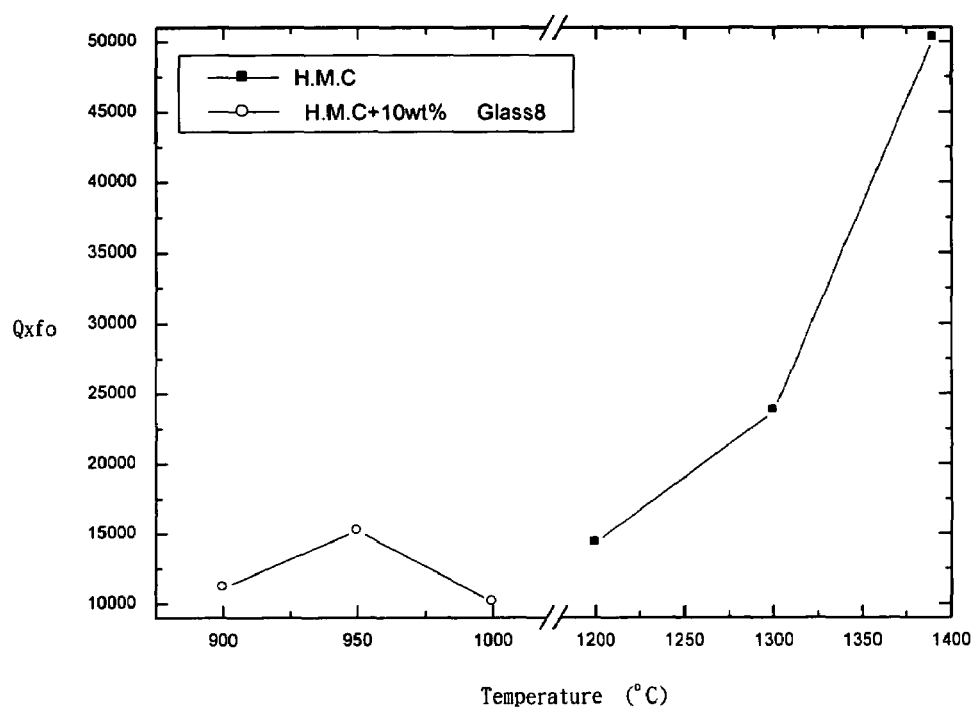
FIG. 22 is a comparison diagram illustrating the values Q×fo of the pure H.M.C as well as the H.M.C with the addition of a glass and an additional planetary milling H.M.C with the addition of a glass and an additional planetary milling.
Figure 23:
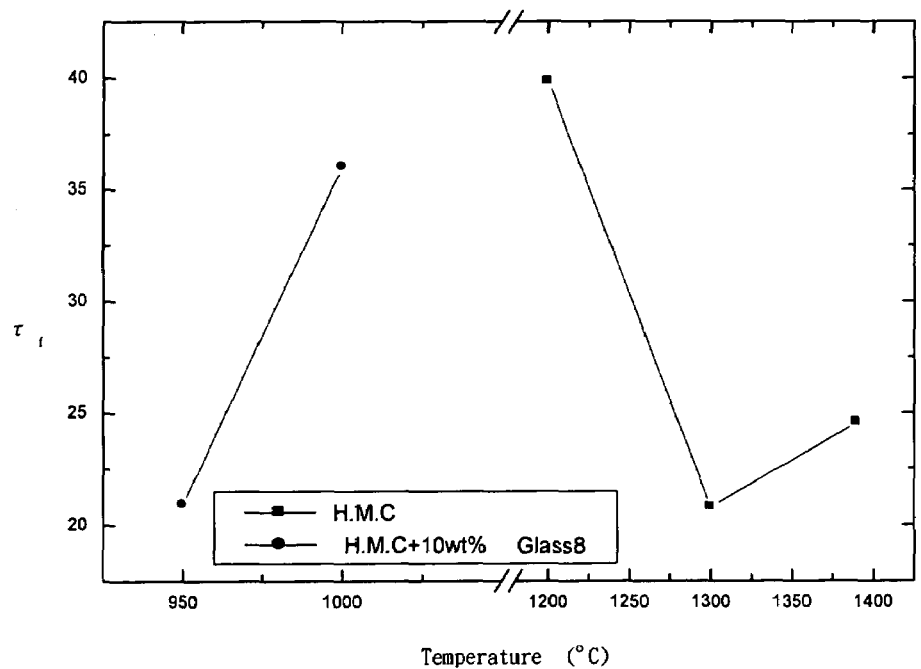
FIG. 23 is a comparison diagram illustrating the values $\tau_f$ of the pure H.M.C as well as the H.M.C with the addition of a glass and an additional planetary milling H.M.C with the addition of a glass and an additional planetary milling.

With the addition of Glass 8, the sintered density of H.M.C with further planetary milled and sintered at 900° C. is high than that of pure H.M.C sintered at 1200° C. (as shown in FIG. 20). After additional milling and sintering at 900° C., the $\epsilon_r$ of the H.M.C can reach 32 (as can be seen in FIG. 21), the Q×fo is 11,146 (as shown in FIG. 22), and the value $\tau_f$ is maintained below 30 ppm/° C. (as shown in FIG. 23). When sintered at 950° C., the Q×fo can reach above 15,000. When the sintering temperature is increased to 1,000° C., the value $\epsilon_r$ can reach 36 (as shown in FIG. 21). That is, in a case that Glass 8 is added to the H.M.C and a subsequent planetary milling is performed, the sintering temperature can be reduced to 900° C. and a good microwave property is maintained. The comparison of the density and electrical property (after sintered) for the pure H.M.C and the H.M.C. with the addition of a glass and followed by an planetary milling are listed in Table 7.

Figure 24:
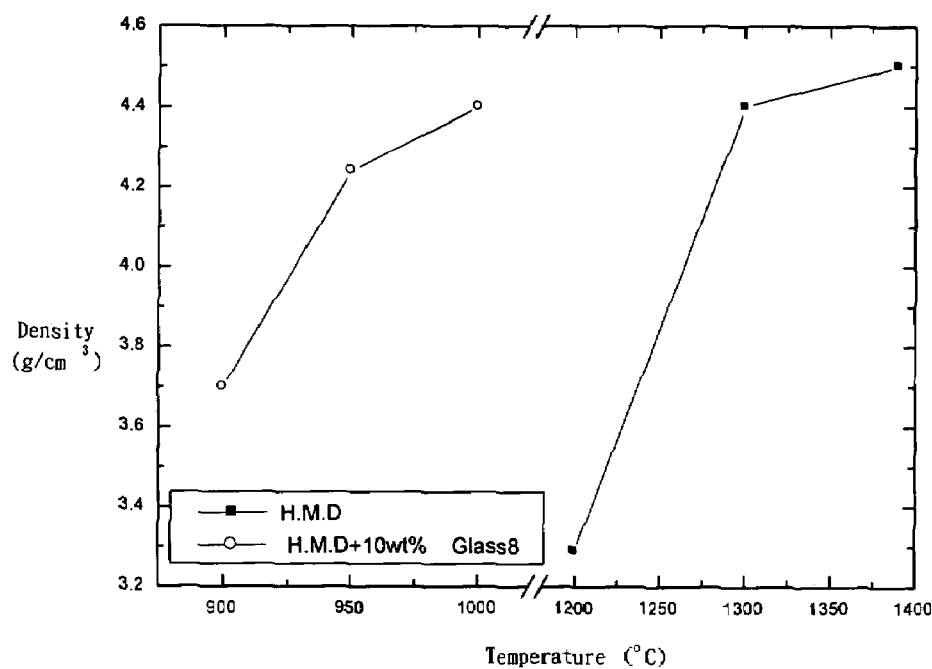
FIG. 24 is a comparison diagram illustrating the sintering densities of the pure H.M.D as well as the H.M.D with the addition of a glass and an additional planetary milling H.M.D with the addition of a glass and an additional planetary milling.
Figure 25:
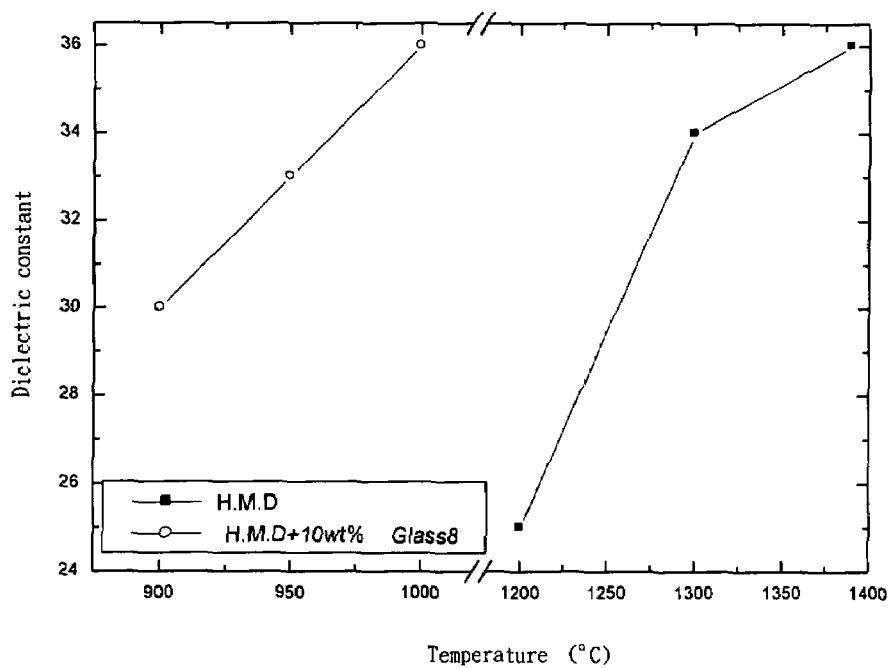
FIG. 25 is a comparison diagram illustrating the dielectric constants of the pure H.M.D as well as the H.M.D with the addition of a glass and an additional planetary milling H.M.D with the addition of a glass and an additional planetary milling.
Figure 26:
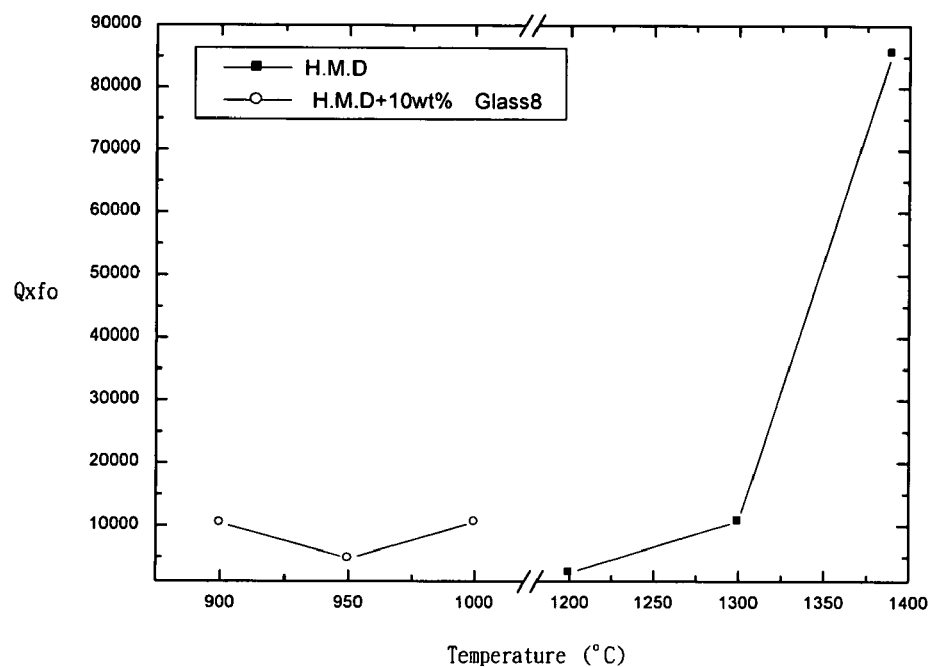
FIG. 26 is a comparison diagram illustrating the values Q×fo of the pure H.M.D as well as the H.M.D with the addition of a glass and an additional planetary milling H.M.D with the addition of a glass and an additional planetary milling.
Figure 27:
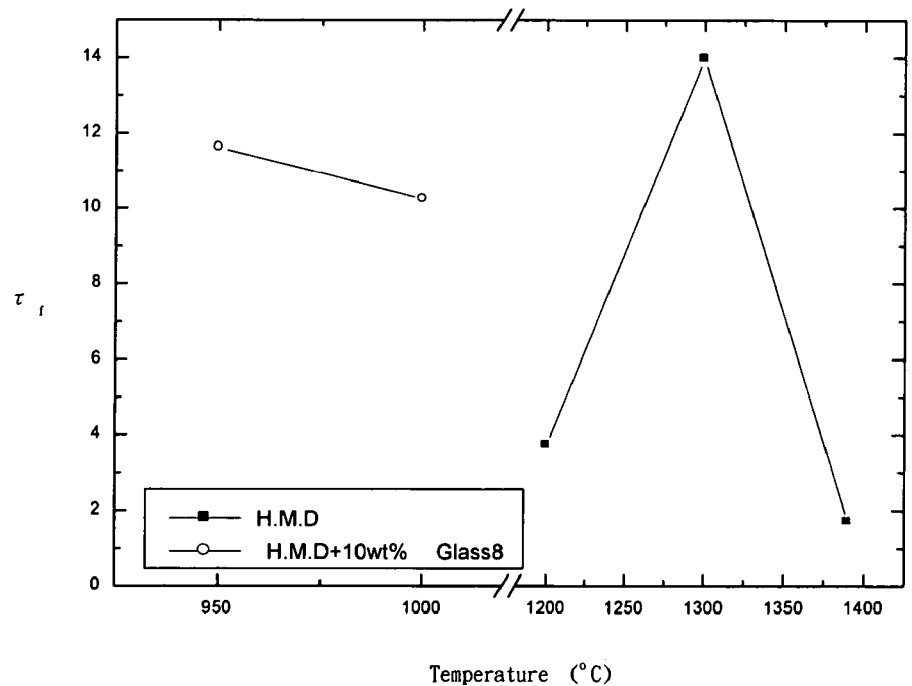
FIG. 27 is a comparison diagram illustrating the values $\tau_f$ of the pure H.M.D as well as the H.M.D with the addition of a glass and an additional planetary milling H.M.D with the addition of a glass and an additional planetary milling.

Similarly, with the addition of Glass 8, the sintering density obtained for H.M.D with additional planetary milling and sintered at 900° C. better than that pure H.M.C sintered at 1200° C. (as shown in FIG. 24). In views of the electrical properties, after micro-machined and sintered at 900° C., the $\epsilon_r$ of the H.M.D is 30 (as can be seen in FIG. 25), the Q×fo is 10,415 (as shown in FIG. 26), and the $\tau_f$ is maintained below 10 ppm/° C. (as shown in FIG. 27). When sintered at 1,000° C., the $\epsilon_r$ can reach 36 (as shown in FIG. 25). That is, in a case that Glass 8 is added to the H.M.D and a subsequent planetary milling is performed, the sintering temperature can be reduced to 900° C. and a good microwave property is maintained. The comparison of the density and electrical property (after sintered) for the H.M.D and the H.M.D. with the addition of a glass and an additional milling are listed in Table 8.

TABLE 7

| Composition | Sintering temperature (° C.) | D (g/cm³) | $\epsilon_r$ | Q × fo | $\tau_f$ (ppm/° C.) |
|---|---|---|---|---|---|
| H.M.C | 1200 | 3.84 | 30 | 14341 | 39.83 |
| | 1300 | 4.39 | 38 | 23767 | 20.79 |
| | 1390 | 4.14 | 35 | 50302 | 24.56 |
| H.M.C + 10 wt % Glass 8-P.M.8h | 900 | 3.4 | 32 | 11146 | — |
| | 950 | 3.99 | 33 | 15211 | 20.91 |
| | 1000 | 4.37 | 36 | 10116 | 36.03 |

TABLE 8

| Composition | Sintering temperature (° C.) | D (g/cm$^3$) | $\epsilon_r$ | Q × fo | $\tau_f$ (ppm/° C.) |
|---|---|---|---|---|---|
| H.M.D | 1200 | 3.29 | 25 | 2408 | 3.73 |
|  | 1300 | 4.4 | 34 | 10761 | 13.98 |
|  | 1390 | 4.5 | 36 | 85685 | 1.69 |
| H.M.D + 10 wt % Glass 8-P.M.8h | 900 | 3.7 | 30 | 10415 | — |
|  | 950 | 4.24 | 33 | 4669 | 11.61 |
|  | 1000 | 4.4 | 36 | 10581 | 10.24 |

The present invention, when comparing with other previous conventional technologies, has following advantages:

1. The sintering temperature of the microwave dielectric ceramic material can be effectively reduced to less than 1,000° C. and good dielectric constants ($\epsilon_r$) are maintained. In addition, good microwave dielectric properties are attained, for example : $\tau_f \leq \pm 30$ ppm/° C. and Q×f>5,000.

2. The microwave dielectric ceramic material of the present invention is suitable for co-firing with low melting and cost-effective metallic electrodes by adding the low melting metals containing in the metallic electrodes, and thus can be applied to the production of filters, resonators and capacitors so as to reduce cost.

3. The microwave dielectric ceramic materials of the present invention contain no heavy metals such as lead, cadmium and bismuth, and thus meet the requirement of environmental protection.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A low-temperature sintered barium titanate microwave dielectric ceramic material comprising:
   a host matrix $Ba_xTi_yM_zO_{x+2y+k}$, where x is 1~6, y is 1~17, z is 0~1, k is 0~3, M is an element selected from an alkali metal, an alkaline-earth metal, a transition group or a rare earth group, characterized in that a low melting glass matrix containing 20~35 wt % BaO, 10~30 wt % $B_2O_3$, 10~30 wt % $SiO_2$, 15~30 wt % ZnO, 15~20 wt % $Li_2O$ and 15~25 wt % CuO is added to said host matrix.

2. The low-temperature sintered barium titanate microwave dielectric ceramic material according to claim 1, wherein said glass matrix comprises 1~50 wt % of the total weight of said host matrix and said glass matrix.

3. The low-temperature sintered barium titanate microwave dielectric ceramic material according to claim 2, wherein said glass matrix comprises 30 wt % of the total weight of said host matrix and said glass matrix.

4. The low-temperature sintered barium titanate microwave dielectric ceramic material according to claim 1, wherein said glass matrix is a Ba—B—Si—Li glass containing 35 wt % BaO, 30 wt % $B_2O_3$, 15 wt % $SiO_2$ and 20 wt % $Li_2O$.

5. The low-temperature sintered barium titanate microwave dielectric ceramic material according to claim 1, wherein said glass matrix is a Cu—B—Zn—Si—Li glass containing 20 wt % BaO, 15 wt % $B_2O_3$, 30 wt % $SiO_2$, 15 wt % ZnO, 20 wt % $Li_2O$ and 20 wt % CuO.

6. The low-temperature sintered barium titanate microwave dielectric ceramic material according to claim 1, wherein said glass matrix is a Ba—B—Zn—Si—Li glass containing 25 wt % BaO, 20 wt % $B_2O_3$, 10 wt % $SiO_2$, 30 wt % ZnO and 15 wt % $Li_2O$.

7. An electronic device containing a low-temperature sintered barium titanate microwave dielectric ceramic material comprising a host matrix $Ba_xTi_yM_zO_{x+2y+k}$, where x is 1~6, y is 1~17, z is 0~1, k is 0~3, M is an element selected from an alkali metal, an alkaline-earth metal, a transition group or a rare earth group, characterized in that a low melting glass matrix containing 20~35 wt % BaO, 10~30 wt % $B_2O_3$, 10~30 wt % $SiO_2$, 15~30 wt % ZnO, 15~20 wt % $Li_2O$ and 15~25 wt % CuO is added to said host matrix.

8. A process for producing a low-temperature sintered barium titanate microwave dielectric ceramic material, comprising steps of:
   (1) preparing a ceramic powder containing said host matrix $Ba_xTi_yM_zO_{x+2y+k}$, where x is 1~6, y is 1~17, z is 0~1, k is 0~3, M is an element selected from an alkali metal, an alkaline-earth metal, a transition group or a rare earth group;
   (2) preparing a glass matrix containing 20~35 wt % BaO, 10~30 wt % $B_2O_3$, 10~30 wt % $SiO_2$, 15~30 wt % ZnO, 15~20 wt % $Li_2O$ and 15~25 wt % CuO; and
   (3) mixing said ceramic powder of step (1) and said glass matrix of step (2).

9. The process for producing a low-temperature sintered barium titanate microwave dielectric ceramic material according to claim 8, wherein $B_2O_3$ is further added to said ceramic powder prepared in step (1), and the procedures of rolling mill, drying, calcinations and adding alcohol are successively carried out.

10. The process for producing a low-temperature sintered barium titanate microwave dielectric ceramic material according to claim 9, wherein the mixing step (3) comprises a powder micro-machining stage and a sintering stage at 1,000° C.

* * * * *